United States Patent Office 3,161,668
Patented Dec. 15, 1964

3,161,668
HALOPHENOXYALKYL GLYCOL
MONOBORATE ESTERS
Irving S. Bengelsdorf, Costa Mesa, Calif., assignor to United States Borax & Chemical Corporation, Los Angeles, Calif., a corporation of Nevada
No Drawing. Filed Mar. 9, 1962, Ser. No. 178,557
5 Claims. (Cl. 260—462)

The present invention relates to a new class of glycol monoborate esters and has particular reference to the halophenoxyalkyl glycol monoborate esters, and to a method for preparing the same.

It is, therefore, the principal object of the present invention to provide as new compositions of matter halophenoxyalkyl glycol monoborate esters.

It is a further object of this invention to provide efficient and economically desirable means for preparing the halophenoxyalkyl glycol monoborate esters.

Other objects of the present invention will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, the present invention comprises the halophenoxyalkyl glycol monoborate esters having the formula

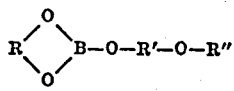

where R is an alkylene radical of from 2 to 4 carbon atoms in length and containing a total of from 2 to 20 carbon atoms, R' is an alkylene radical selected from the group consisting of ethylene and propylene and R" is a halogen substituted phenyl radical containing from 1 to 5 halogen substituents, said halogen substituents selected from the group consisting of chlorine, bromine, and iodine.

The halophenoxyalkyl glycol monoborate esters of the present invention have utility as insecticides, bacteriostats, and fungicides. These compounds are excellent herbicides and they also provide a synergistic effect when combined with many of the presently available herbicidal compositions. In addition, these compounds find further utility as epoxy resin curing agents, and as active ingredients in the preparation of other resins, adhesives and coating compositions.

The method for preparing the present halophenoxyalkyl glycol monoborate esters can best be illustrated by the following equations:

(1)
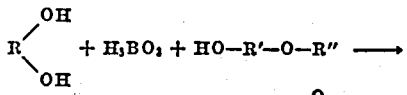

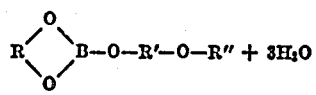

(2)
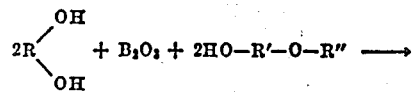

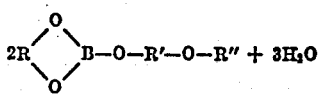

where R, R', and R" are as defined in the foregoing broadly stated paragraph. These reactions will proceed when there is an excess of reactants. Such excess, however, tends to interfere with the separation of the desired product from the reaction mass, and for the sake of economy and ease of separation, in the preferred embodiment of the invention, I use stoichiometric amounts of the reactants.

The preferred method for performing the above reactions is a direct single-step process which involves admixing a glycol, a suitable alcohol, and either boric acid or boron trioxide in the presence of a hydrocarbon solvent which will form an azeotrope with the water of reaction. The admixture is then heated under reflux for a short period of time to complete the reaction and the water-hydrocarbon solvent azeotrope is removed by distillation. Any excess solvent present is then removed from the remaining reaction mass by distillation, and the desired halophenoxyalkyl glycol monoborate ester is recovered as the residue.

I have found that the removal of the water of reaction is greatly facilitated when an excess of the azeotroping agent is present, and in the preferred embodiment of the invention I use from about 1 to 5 or more volumes of hydrocarbon solvent per volume of reactants present. Such common solvents as benzene, n-heptane, xylene, aliphatic naphtha, and toluene are illustrative of the hydrocarbon solvents applicable as azeotroping agents to the present invention.

The halophenoxyalkanols applicable to the present invention have the formula

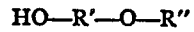

where R' is either an ethylene radical or a propylene radical and R" is a halogen substituted phenyl radical containing from 1 to 5 chlorine, bromine, or iodine substituents.

The following list is illustrative of the halophenoxyalkanols applicable to the present invention:

2-(3-bromophenoxy)ethanol
2-(2-chlorophenoxy)ethanol
2-(2,4-dichlorophenoxy)ethanol
2-(2,4,6-trichlorophenoxy)ethanol
2-(2,4,5-tribromophenoxy)ethanol
1-(2,4-dichlorophenoxy)-2-propanol
1-(2-bromophenoxy)-2-propanol
1-(2,3,4,6-tetrabromophenoxy)-2-propanol
1-(pentachlorophenoxy)-2-propanol
1-(2,4,5-trichlorophenoxy)-2-propanol
2-(4-iodophenoxy)ethanol The glycols applicable to the present invention are diols containing from 2 to 20 carbon atoms in which 2 to 4 carbon atoms separate the two hydroxyl groups. The following are illustrative of these compounds:

1,2-butanediol
1,2-pentanediol
1,3-butanediol
1,3-propanediol
2,3-butanediol
1,4-butanediol
1,2-ethanediol
2-methyl-2,4-pentanediol
2,2-dimethyl-1,3-butanediol
2-ethyl-1,3-hexanediol
2-methyl-2-ethyl-1,3-propanediol
2-methyl-2-propyl-1,3-propanediol It is to be clearly understood that the foregoing lists are only a partial enumeration of the reactants applicable to the present invention and are in no way intended to limit the invention.

So that the present invention can be more clearly understood, the following examples are given for illustrative purposes:

I

A mixture of 41.4 grams (0.2 mole) of 2-(2,4-dichlorophenoxy)ethanol, 12.4 grams (0.2 mole) of boric acid, and 23.6 grams (0.2 mole) of 2-methyl-2,4-pentanediol was placed in a 500 ml. round-bottomed flask containing 200 ml. of toluene. The flask was equipped with a reflux condenser, a Dean-Stark trap and a magnetic stirrer, and was heated for about 2 hours under reflux at which time the theoretical amount of water, 10.8 ml., had been removed. The excess toluene was then removed by distillation and 65.0 grams (97.6% yield) of 2-[β-(2,4-dichlorophenoxy)ethoxy] - 4,4,6 - trimethyl - 1,3,2 - dioxaborinane was recovered. Chemical analysis of the product yielded the following datum:

Calculated for $C_{14}H_{19}BCl_2O_4$: B=3.25%. Found in product: B=3.29%.

II

A mixture of 217.1 grams (1.0 mole) of 2-(3-bromophenoxy)ethanol, 34.8 grams (0.5 mole) of boron trioxide, and 90.1 grams (1.0 mole) of 1,3-butanediol was placed in a 2 liter round-bottomed flask containing 500 ml. of benzene. The flask was equipped with a reflux condenser, a Dean-Stark trap, and a magnetic stirrer, and was heated for about 3 hours under reflux at which time the theoretical amount, 24 ml., of water had been removed. The excess benzene was then removed by distillation and 309.3 grams (98.2% yield) of 2-[β-(3-bromophenoxy)ethoxy]-4-methyl-1,3,-dioxaborinane was recovered. Chemical analysis of the product yielded the following datum:

Calculated for $C_{12}H_{16}BBrO_4$: B=3.43%. Found in product: B=3.34%.

III

A mixture of 128.2 grams (0.5 mole) of 1-(2,4,5-trichlorophenoxy)-2-propanol, 30.9 grams (0.5 mole) of boric acid, and 59.1 grams (0.5 mole) of 2,2-dimethyl-1,3-butanediol was placed in a 2 liter round-bottomed flask containing 500 ml. of xylene. The flask was equipped with a reflux condenser, a Dean-Stark trap, and a magnetic stirrer, and was heated for about 3 hours under reflux at which time the theoretical amount, 24 ml., of water had been removed. The excess xylene was then removed by distillation and 185.5 grams (97.3% yield) of 2-[β-(2,4,5-trichlorophenoxy)-α-methylethoxy] - 4,5,5 - trimethyl-1,3,2-dioxaborinane was recovered. Chemical analysis of the product yielded the following datum:

Calculated for $C_{15}H_{20}BCl_3O_4$: B=2.84%. Found in product: B=2.76%.

IV

A mixture of 124 grams (0.4 mole) of 1-(2,5-dibromophenoxy)-2-propanol, 13.9 grams (0.2 mole) of boron trioxide, and 30.4 grams (0.4 mole) of 1,3-propanediol was placed in a 2 liter round-bottomed flask containing 400 ml. of toluene. The flask was equipped with a reflux condenser, a Dean-Stark trap, and a magnetic stirrer, and was heated under reflux for about 2.5 hours at which time the theoretical amount, 10.8 ml., of water had been removed. The excess toluene was then removed by distillation and 151 grams (95.8% yield) of 2-[β-(2,5-dibromophenoxy)-α-methylethoxy] - 1,3,2 - dioxaborinane was recovered. Chemical analysis of the product yielded the following datum:

Calculated for $C_{12}H_{15}BBr_2O_4$: B=2.75%. Found in product: B=2.83%.

V

A mixture of 110 grams (0.5 mole) of 2-(p-iodophenoxy)ethanol, 12.4 grams (0.2 mole) of boric acid, and 23.6 grams (0.2 mole) of 2-methyl-2,4-pentanediol was placed in a 500 ml. round-bottomed flask containing 200 ml. of toluene. The flask was fitted with a reflux condenser, a Dean-Stark trap, and a magnetic stirrer, and heated for about two hours under reflux at which time the theoretical amount of water, 10.8 ml., had been removed. Excess toluene was removed by distillation and 76 grams (97.5% yield) of 2-[β-(p-iodophenoxy)-ethoxy]-4,4,6-trimethyl-1,3,2-dioxaborinane was recovered. Chemical analysis of the product yielded the following datum:

Calculated for $C_{14}H_{20}BIO_4$: B=2.82%. Found in product: B=2.76%.

Other modes of applying the principle of the invention may be employed, change being made as regards the details described, provided the features stated in any of the following claims or the equivalent of such be employed.

I, therefore, particularly point out and distinctly claim as my invention:

1. Halophenoxyalkyl glycol monoborate esters having the formula

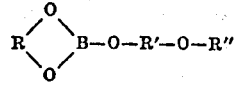

where R is an alkaline radical of from 2 to 4 carbon atoms in length and containing a total of from 2 to about 10 carbon atoms, R' is an alkylene radical selected from the group consisting of ethylene and propylene, and R" is a halogen substituted phenyl radical containing from 1 to 5 halogen substituents, said halogen substituents selected from the group consisting of chlorine, bromine and iodine.

2. 2-[β-(2,4 - dichlorophenoxy)ethoxy] - 4,4,6-trimethyl-1,3,2-dioxaborinane.

3. 2-[β-(3-bromophenoxy)ethoxy] - 4 - methyl-1,3,2-dioxaborinane.

4. 2-[β-(2,4,5-trichlorophenoxy) - α - methylethoxy]-4,5,5-trimethyl-1,3,2-dioxaborinane.

5. 2-[β-(p-iodophenoxy)ethoxy] - 4,4,6 - trimethyl-1,3,2-dioxaborinane.

References Cited in the file of this patent

UNITED STATES PATENTS

| | | |
|---|---|---|
| 2,260,336 | Prescott et al. | Oct. 28, 1941 |
| 2,260,337 | Prescott et al. | Oct. 28, 1941 |
| 2,904,578 | Brust | Sept. 15, 1959 |
| 2,994,713 | Lane | Aug. 1, 1961 |